United States Patent
Longwell et al.

(10) Patent No.: US 7,134,069 B1
(45) Date of Patent: Nov. 7, 2006

(54) METHOD AND APPARATUS FOR ERROR DETECTION AND CORRECTION

(75) Inventors: Michael L. Longwell, Austin, TX (US); William Daune Atwell, Spicewood, TX (US); Jeffrey Van Myers, Driftwood, TX (US)

(73) Assignee: Madrone Solutions, Inc., Spicewood, TX (US)

( * ) Notice: Subject to any disclaimer, the term of this patent is extended or adjusted under 35 U.S.C. 154(b) by 0 days.

(21) Appl. No.: 09/334,238

(22) Filed: Jun. 16, 1999

(51) Int. Cl.
*G06F 11/00* (2006.01)
*G11C 29/00* (2006.01)

(52) U.S. Cl. ..................... 714/800; 714/763

(58) Field of Classification Search ........... 714/800, 714/801, 701, 718, 799, 763, 764, 766, 744, 714/6, 42, 52, 54, 802, 758, 757; 365/200, 365/201
See application file for complete search history.

(56) References Cited

U.S. PATENT DOCUMENTS

| | | | | |
|---|---|---|---|---|
| 4,719,628 A | * | 1/1988 | Ozaki et al. ............... 714/755 |
| 5,313,425 A | * | 5/1994 | Lee et al. .................... 365/201 |
| 5,432,729 A | * | 7/1995 | Carson et al. ................ 365/63 |
| 5,479,418 A | * | 12/1995 | Hughes-Hartogs .......... 714/755 |
| 5,721,739 A | * | 2/1998 | Lyle ........................... 714/755 |
| 6,216,251 B1 | * | 4/2001 | McGinn ..................... 714/800 |
| 6,598,197 B1 | * | 7/2003 | Peterson et al. ............ 714/763 |

OTHER PUBLICATIONS

"Error Detecting Refreshment for Embedded DRAMs", IEEE 1999. pp. 384 to 390. 1093-0167/99.
"Some basics on Block Turbo Code" 1994 by Ramesh Pyndiah 5 pgs., http://www-sc.enst-bretagne.fr/turbo/btc.html#figure1.

* cited by examiner

*Primary Examiner*—Christine T. Tu
(74) *Attorney, Agent, or Firm*—Jeffrey Van Myers

(57) ABSTRACT

A Random Access Error Detection and Correction unit (RAEDAC) that incorporates a bit-wise error detection and correction unit (BEDAC) in a memory system. In one embodiment, a word-wise error detection and correction unit (WEDAC) operates in coordination with a BEDAC that performs a bit-wise parity calculation. In another embodiment, a WEDAC operates in coordination with a full bit-wise BEDAC that calculates bit-wise check bits. The RAEDAC may be applied to create a multi-dimensional EDAC where, for example, the memory is partitioned into a stack of planes, and a stack-wise error detection and correction unit (SEDAC) is implemented.

16 Claims, 12 Drawing Sheets

FIG. 5A

|  | ROW0 | ROW1 | ROW2 | ROW3 | ROW4 | ROW5 | ROW6 | ROW7 |  |
|---|---|---|---|---|---|---|---|---|---|
| CLEAR |  |  |  |  | X |  | X | X | BCB0 |
| CLEAR |  |  |  | X | X | X |  |  | BCB1 |
| CLEAR |  | X | X |  |  | X |  |  | BCB2 |
| CLEAR | X |  |  |  |  |  | X | X | BCB3 |
| SET   |  |  | X |  | X |  | X | X | BCB4 |

FIG. 5B

|  | RA2 | RA1 | RA0 | BCB4 | BCB3 | BCB2 | BCB1 | BCB0 |
|---|---|---|---|---|---|---|---|---|
| ROW0 | 0 | 0 | 0 | 0 | 0 | 1 | 1 | 1 |
| ROW1 | 0 | 0 | 1 | 0 | 1 | 0 | 1 | 1 |
| ROW2 | 0 | 1 | 0 | 1 | 1 | 0 | 1 | 1 |
| ROW3 | 0 | 1 | 1 | 0 | 1 | 1 | 0 | 1 |
| ROW4 | 1 | 0 | 0 | 1 | 1 | 1 | 0 | 0 |
| ROW5 | 1 | 0 | 1 | 0 | 1 | 0 | 0 | 1 |
| ROW6 | 1 | 1 | 0 | 1 | 0 | 1 | 1 | 0 |
| ROW7 | 1 | 1 | 1 | 1 | 0 | 1 | 1 | 0 |

METHOD AND APPARATUS FOR ERROR DETECTION AND CORRECTION

FIELD OF THE INVENTION

The present invention relates to integrated circuit dynamic memories, and more specifically to methods of detecting and correcting errors in dynamic memories.

BACKGROUND OF THE INVENTION

Typical dynamic memories store data as charges on storage capacitors. Over time the storage capacitors lose charge and eventually the memory loses data. Dynamic memory devices therefore require a refresh operation to maintain the charge on the storage capacitors and thus maintain data. The refresh operation typically involves sensing the charge on the storage capacitor and reinforcing the charge.

In a dynamic memory such as a Dynamic Random Access Memory (DRAM), the refresh operation does not avoid all losses of data. Loss of data may be due to irreparable hardware failures, referred to as hard errors. DRAMs also experience transient loss of data, referred to as soft errors. The number of soft errors experienced per size of memory and over time is referred to as the Soft Error Rate (SER) or Failure In Time (FIT) rate.

The system data integrity and reliability is often measured by the SER. The SER is responsive to a variety of design, manufacture, and application specific issues. The marginal design of hardware may effect the SER by not considering the most common causes of such failures. Similarly, operating conditions may tend to increase the SER. For example, poor regulation or intentional deregulation of power supplies compromises the ability to correctly sense the contents of the DRAM bit cells. Additionally, operation of the DRAM at high temperatures increases leakage of the storage cell affecting the ability of the cells to maintain the stored charge. Another consideration is packaging, where problems relating to radioactivity, as well as other manufacturing and packaging issues effect the SER. Packaging materials that emit alpha particles and/or cosmic radiation are classically studied sources of SER problems in DRAMs.

In general, DRAM design and manufacture balance SER requirements against cost, as reducing SER typically adds additional circuitry, reduces operating speed and increases power dissipation. As the DRAM industry moves to lower voltage operation, the stored charge of the storage cells is reduced, increasing SER. Additionally, advances in semiconductor process technology and economic pressure to reduce cost by increasing circuit density tend to result in reduction of the capacitance of DRAM storage capacitors. Reduced charge (Q=CV) stored in DRAM bit cells results in increased SER because of an inverse exponential relationship between stored charge and SER.

Various methods have been developed to detect and correct soft and hard errors. An Error Detection And Correction unit (EDAC) is used to detect errors in stored data, and if possible, correct errors in the data. EDACs greatly improve data integrity. The operation of one type of EDAC is based on a code word. Data to be stored in the memory is provided to the EDAC. The EDAC then generates check bits based on the data value. The check bits are then combined with the data to form a code word. The code word is then stored in the memory. To check the data, the EDAC reads the code word from the memory and recalculates the check bits based on the data portion of the code word. The recalculated check bits are then compared to the check bits in the code word. If there is a match, the data is correct. If there is a difference and the error is correctable, the EDAC provides the correct data and check bits as an output. If there is a difference and the error is detectable but uncorrectable, the EDAC reports the occurrence of a catastrophic failure.

A variety of EDAC techniques and circuits are available, as are a variety of methods for generating code words and performing bit checks. Some methods are discussed in U.S. Pat. No. 5,598,422, by Longwell, et al., entitled "Digital computer having an error correction code (ECC) system with comparator integrated into re-encoder," and in *Error-Correction Codes*, by W. W. Peterson, 2d edition, MIT Press (1972).

The codeword generated by an EDAC is dependent upon the size of the data component and the required level of detectability and correctability of errors. As the number of errors the EDAC is able to detect and the number of errors the EDAC is able to correct increase, the number of check bits, and thus the number of bits in the codeword increases. As the codeword increases so does the complexity of the EDAC. This complexity adds to the circuitry required and also reduces the speed of operation of the EDAC and therefore of the DRAM.

Therefore a need exists for an efficient method to detect and correct errors in a dynamic memory. A need exists for an EDAC apparatus that reduces the SER even as the size of the memory cell shrinks, and over a broad range of considerations, such as manufacturing, packaging, design, and application. Further, a need exists to develop an integrated method of error detection and correction for an embedded DRAM, where the DRAM includes an array of memory tiles. Still further a need exists to increase the capability of error detection and correction without increasing the complexity of the individual EDAC units.

BRIEF DESCRIPTION OF THE DRAWINGS

The present invention may be more fully understood by a description of certain preferred embodiments in conjunction with the attached drawings in which:

FIG. 5, comprising FIGS. 5A and 5B, illustrates in tabular form one method of row address decode and code word assignment as implemented in FIG. 4;

FIG. 8, comprising

DETAILED DESCRIPTION OF THE PREFERRED EMBODIMENTS

Figure 1:
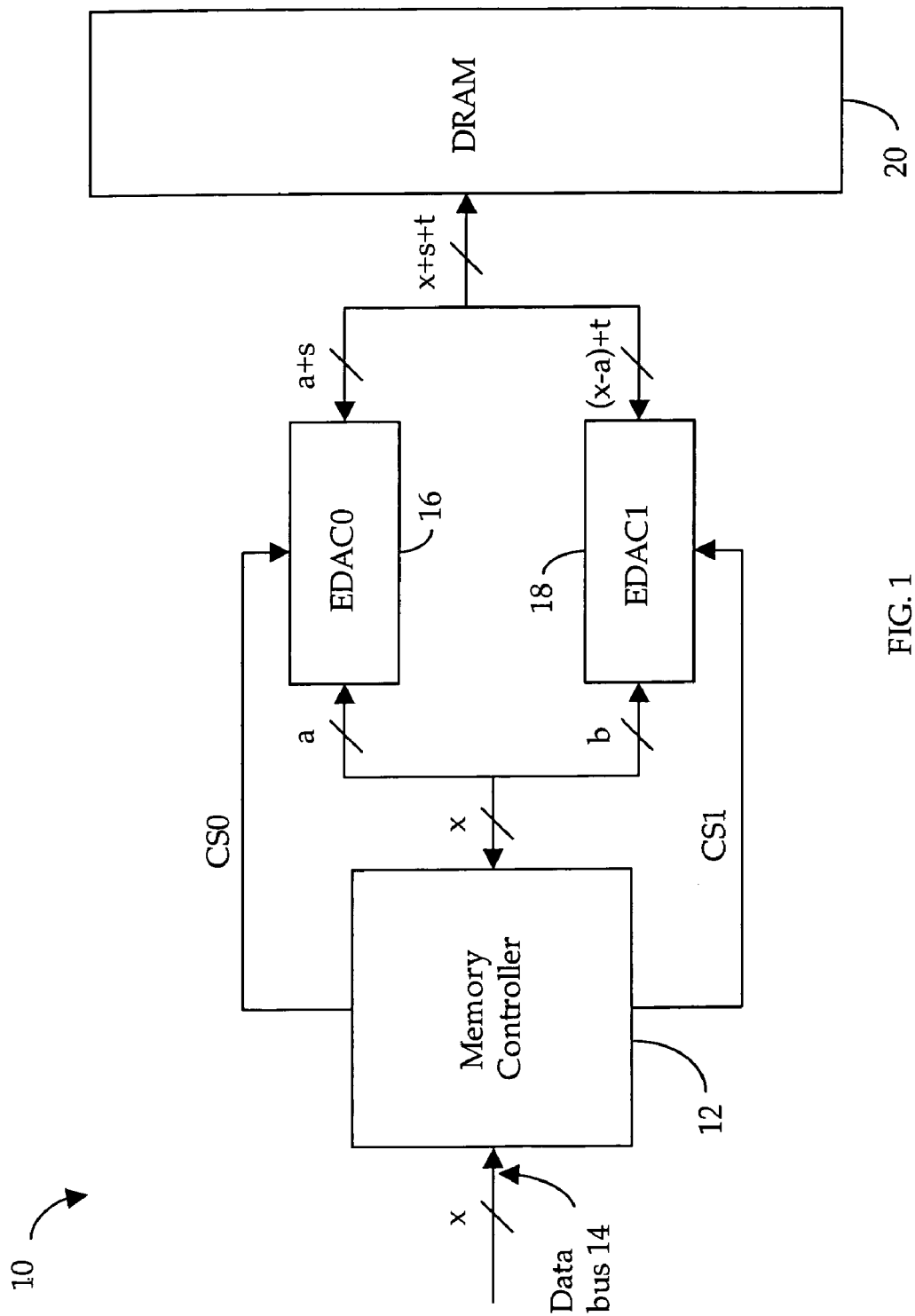
FIG. 1 illustrates in block diagram form a memory system having distributed error detection and correction (EDAC) units according to one embodiment of the present invention.

Throughout this description the terms "assert" and "negate" will be used when referring to the rendering of a signal, status bit, or similar apparatus into its logically true or logically false state, respectively. Similarly, with respect to information or data stored in a memory, a "zero" value is a low potential value, and a "one" is a high potential value.

One embodiment of the present invention provides a means of reducing the complexity of a single, large EDAC by distributing the EDAC function across multiple, smaller EDAC circuits. This reduces the complexity of the EDAC calculation and increases the speed of operation and throughput.

Another embodiment of the present invention extends the operating environment in which a DRAM can reliably store data. In addition to traditional word-wise EDAC units, the present invention provides a bit-wise error detection and correction capability that expands the range of errors detected and corrected. The bit-wise error detection and correction may incorporate a simple bit-wise parity calculation, which allows many double-bit word-wise errors to be detected and corrected in concert with a word-wise EDAC unit. The bit-wise method may be expanded to provide a full bit-wise EDAC, where the same bit of each word stored in the DRAM is used to calculate check bits which are stored in the bit-wise EDAC. If desired, the DRAM can be partitioned into two or more sub-arrays, either physical (e.g., contiguous) or logical (e.g., interleaved or interdigitated), and a separate bit-wise parity generator or EDAC provided for each partition, thereby reducing correction time and increasing coverage of related or correlated errors. In this way, multiple double-bit errors are correctable at low hardware cost. For convenience of reference, we will refer to a word-wise EDAC as an "WEDAC" and a bit-wise EDAC as a "BEDAC".

In one aspect of the present invention a memory system includes a memory having a plurality of dynamic memory cells, each cell storing a bit, an access circuit connected to the memory to access, during an access cycle, a selected set of the bits stored in said memory cells, and an error detection circuit connected to the access circuit and said memory to detect an error in a bit accessed during said access cycle. The error detection circuit includes a first error detection circuit to detect an error in a bit of a first subset of said accessed bits; and a second error detection circuit to detect an error in a bit of a second subset of said accessed bits.

In another aspect of the present invention, a memory system includes a memory having first and second groups of dynamic memory cells, each cell storing a bit, an access circuit connected to the memory and an error detection circuit. The access circuit is adapted to access, during an access cycle, a selected one of a first set of the bits stored in said first group of said memory cells, and a second set of the bits stored in said second group of said memory cells. The error detection circuit is connected to the access circuit and said memory to detect an error in a bit accessed during said access cycle. The error detection circuit includes a first error detection circuit to detect an error in a bit of said first set of accessed bits, and a second error detection circuit to detect an error in a bit of said second set of accessed bits.

According to still another aspect of the present invention, a memory system includes a memory having a plurality of dynamic memory cells arranged in a plane of rows and columns, each cell storing a bit, an access circuit connected to the memory to access, during an access sequence, all of the bits stored in said plane of said memory cells, and an orthogonal error detection circuit connected to the access circuit and said memory to detect an error in a bit accessed during said access sequence. The orthogonal error detection circuit including a row error detection circuit to detect an error in a bit of a row of said accessed bits, and a column error detection circuit to detect an error in a bit of a column of said accessed bits.

In one embodiment of the present invention, a circuit for use in a memory system includes a memory having a plurality of dynamic memory cells arranged in a plane of rows and columns, each cell storing a bit, an access circuit connected to the memory to access, during an access sequence, all of the bits stored in said plane, and a row error detection circuit connected to the access circuit and said memory to detect an error in a bit of a row of said accessed bits. The row detection circuit having a parity generation circuit connected to said memory to generate a parity bit related to all bits stored in a respective one of said columns.

In another embodiment of the present invention, a random access error detection and correction (RAEDAC) unit for detecting and correcting errors in an ordered bit string of predetermined length, includes a parity generation circuit which receives, in any order, each bit of said string, and generates a plurality of parity bits, each related to a unique combination of said bits comprising said string, an error detection circuit connected to said parity generation circuit to detect an error in a bit of said string using said parity bit, and an error correction circuit coupled to the parity check circuit to correct said detected bit error.

FIG. 1 illustrates, in block diagram form, memory system 10 according to one embodiment of the present invention, where the memory system 10 interfaces with, and forms a portion of, a conventional data processing system (not illustrated). The memory system 10 includes a memory controller 12 which transmits and receives data on a data bus 14. The data bus 14 is illustrated as having "x" conductors for simultaneously communicating x bits of data. The memory controller 12 receives the x bits of data via data bus 14 and distributes the data to a first WEDAC unit, WEDAC0 16 and to a second WEDAC unit, WEDAC1 18.

The memory controller 12 generates chip select signals, CS0 and CS1, to selectively enable WEDAC0 16 and WEDAC1 18, respectively. When a chip select signal is asserted, data is provided to the corresponding WEDAC unit. The chip select signals may also be referred to as WEDAC select signals.

The memory controller 12 distributes the data by providing one portion to WEDAC0 16 and another portion to WEDAC1 18. As illustrated in FIG. 1, WEDAC0 16 receives a bits of data, where a is a predetermined number, usually a power of 2, whereas WEDAC1 18 receives the remaining (x−a) bits of data. Note that memory system 10 is an exemplar of a distributed EDAC memory system; alternate embodiments may include any number of EDAC units.

According to one embodiment, each of the multiple WEDAC units receives an equal number of data bits, such as where x=128, a=64, and (x−a)=64. For multiple WEDAC units each receiving an equal number of data bits, the total data bits, x, is divided by the total number of WEDAC units to determine the number of data bits each WEDAC unit receives. According to an alternate embodiment, each WEDAC unit receives a predetermined number of data bits, which are not necessarily equal. As more WEDAC units are added, the memory controller 12 generates additional chip select signals. In systems having dynamic bus sizing, subsets of the multiple WEDAC units may be selectively enabled on a cycle-by-cycle basis, depending upon the respective bus size. It may be advantageous to selectively enable a portion of the data bus through WEDAC0 16 while the rest of the data bus is not active. In general, the number of check bits required is sized according to the size of the active portion of the data bus 14.

In general, the number of check bits is a function of the desired system integrity, as well as the number of data bits. A WEDAC unit forms a code word by generating a plurality of check bits depending upon the value of a set of data bits. As illustrated in FIG. 1, the code word generated by WEDAC0 16 will have (a+s) bits. The so-called "Hamming distance" between two valid code words is the number of bit positions in which the code words differ. In general, if two code words are a Hamming distance, d, apart, it will require d single-bit errors to convert one into the other. For single-bit error detection and correction, the number of check bits, s, is thus determined by the Hamming equation, given in our example as:

$$(a+s+1) \leq 2^s$$

which allows code words to be separated such that single-bit errors do not convert one code word into another. This is derived from the fact that each of the $2^a$ valid code words handled by WEDAC0 16 has (a+s) invalid code words at a distance of 1 from it, formed by inverting each of the (a+s) bits in the code word. Therefore, each of the $2^a$ valid code words is surrounded by a buffer zone comprising (a+s+1) invalid bit patterns. The restraint is then reduced to the equation provided herein above.

The generated code words are simultaneously provided to the dynamic random access memory (DRAM 20) by WEDAC0 16 and WEDAC1 18. The WEDAC0 16 adds a predetermined number of check bits, s, to the a data bits, while WEDAC1 18 adds a predetermined number of check bits, t, to the (x−a) data bits. The result is that (x+s+t) bits of information are provided to the DRAM 20. All of the check bits calculated by WEDAC0 16 and WEDAC1 18 are stored in the DRAM 20, together with the data bits. The check bits may be concatenated and stored at the end of all the data bits, or they may be distributed throughout the data bits in any desired manner.

In one embodiment, memory controller 12 receives 128 data bits, and provides WEDAC0 16 with 64 bits and WEDAC1 18 with 64 bits. Each WEDAC generates eight (8) check bits for each of the 64 bits of data. Note that in a memory system having only a single WEDAC unit, the original 128 bits of data would only require nine (9) check bits. Here the total for the two WEDAC units is 16 check bits. On the other hand, the circuitry of the smaller WEDAC units is less complex than that of a single large WEDAC unit, thus decreasing the computation time and circuit area for the WEDACs, as well as increasing throughput and scalability.

Figure 2:
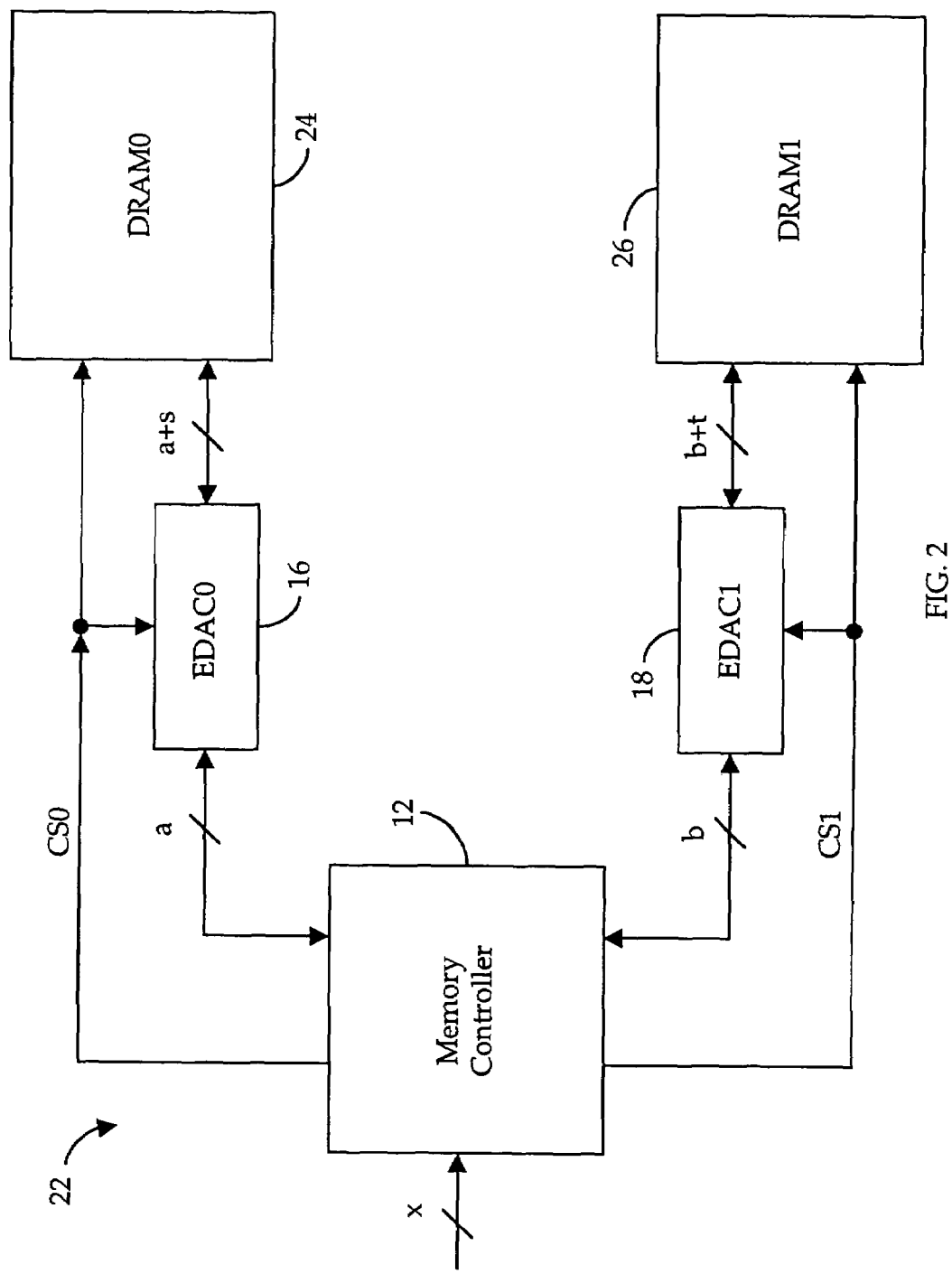
FIG. 2 illustrates in block diagram form a memory system having distributed error detection and correction (EDAC) units according to an alternate embodiment of the present invention.

In an alternate embodiment illustrated in FIG. 2, memory system 2 includes two (or more) DRAM banks which are interleaved, allowing pipelined or partitioned operation, wherein one bank may be refreshed while the other is accessed for normal operation. As in the embodiment shown in FIG. 1, the memory controller 12 generates a separate chip select signal for each WEDAC unit. The WEDAC0 16 receives a predetermined number, a, of data bits, while the WEDAC1 18 receives a predetermined number, b, of data bits, where x=a+b and a and b are not necessarily equal. Each WEDAC unit calculates an appropriate number of check bits according to the number of data bits received. The WEDAC0 16 generates s check bits to form a code word having (a+s) bits for storage in the DRAM0 24. Similarly, WEDAC1 18 generates t check bits to form a code word having (b+t) bits, which is then stored in DRAM1 26. Note that chip select signals, CS0 and CS1 are each coupled to DRAM0 24 and DRAM1 26, respectively. In this way, the memory system 2 may "scrub" the DRAM0 24 while the DRAM1 26 is in normal operating mode and vise versa. As one DRAM may be scrubbed in isolation, the scrubbing operation does not impact the speed or function of the other DRAM. Note that DRAM0 24 and DRAM1 26 may be banks or tiles within a single chip memory, or may be discrete memory devices. Such a tiled memory system and a method for scrubbing are disclosed in our copending patent application entitled "METHOD AND APPARATUS FOR REFRESHING AND SCRUBBING A DYNAMIC MEMORY" by Longwell et al., application Ser. No. 09/313,876, filed May 18, 1999, but now abandoned, and assigned to the assignee hereof, which is expressly incorporated herein by reference.

The distributed WEDAC aspects of the present invention allow the system designer to customize the WEDAC units to the particular characteristics of the memory serviced. The smaller size of the individual WEDAC units increases the speed of the overall operation. Note that while two (2) WEDAC units are illustrated in FIGS. 1 and 2, any number of WEDAC units may be incorporated based upon relevant price, power and performance considerations. Furthermore, some portions of the memory may be covered by simple parity, while other portions may have no error detection capability at all.

Figure 3:
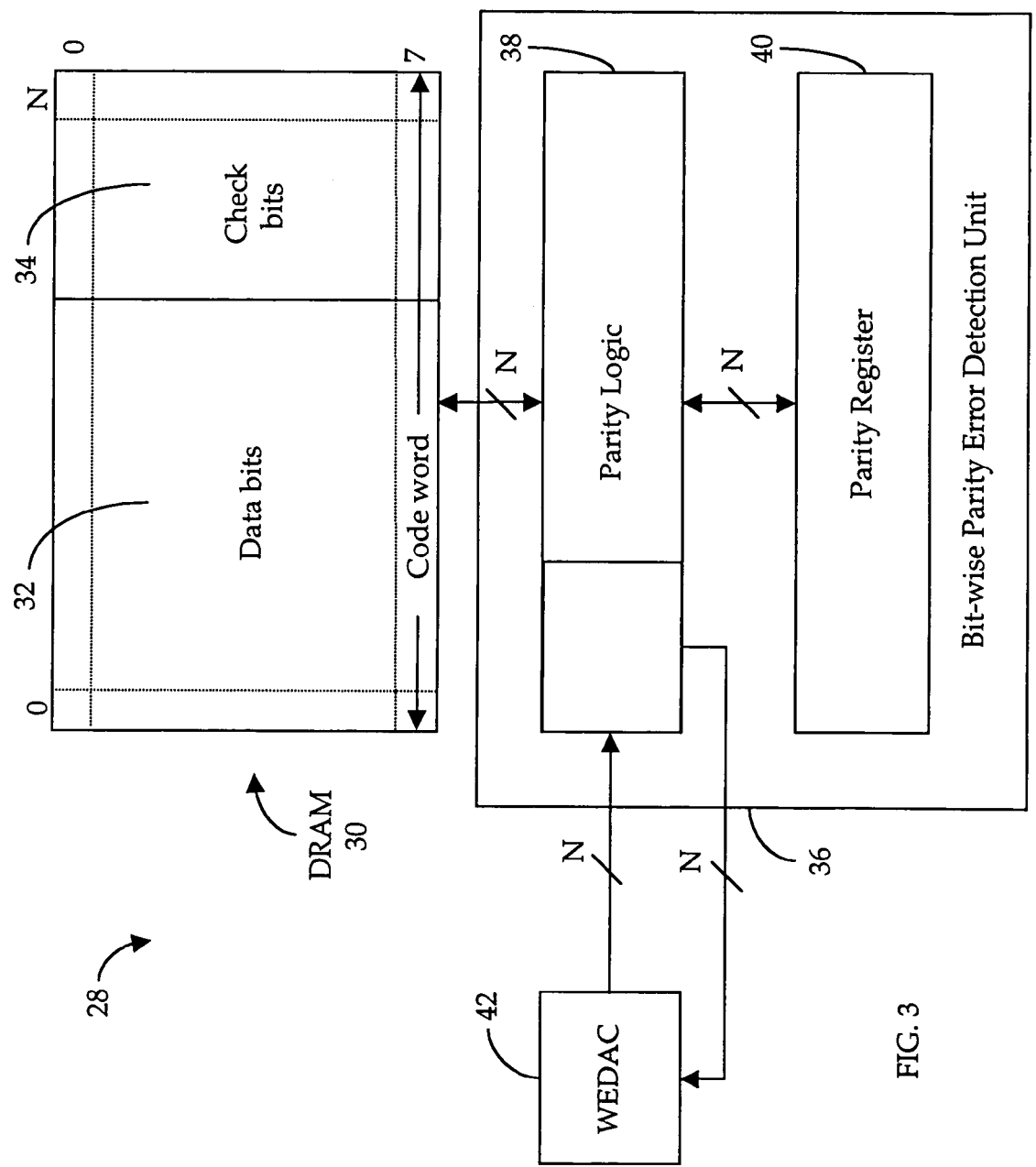
FIG. 3 illustrates in block diagram form a memory system having a column-wise parity error detection circuit according to one embodiment of the present invention.

FIG. 3 illustrates a column-wise parity error detection method which may be implemented in combination with a WEDAC, such as those shown in FIGS. 1 and 2. In memory system 28, the DRAM 30 stores code words as concatenated strings of data bits 32 and check bits 34. A bit-wise parity detection unit 36 is coupled to the DRAM 30. The parity detection unit 36 includes a parity logic circuit 38 and a parity register 40. In operation, the parity logic circuit 38 generates a set of parity bits for storage in the parity register 40, each of which is based upon the state of the set of corresponding bits in each of the code words stored in the DRAM 30. For example, in DRAM 30, the memory cells can be thought of as forming an array of rows and columns. Although multiple code words may be stored in a single row, it will be assumed for purposes of the following discussion that only a single code word (of length (N+1)) is stored in a single row. In such an arrangement, the DRAM 30 can be envisioned as a set of (N+1) columns, numbered 0 to N. Of course, the memory array may include any number of rows and any number of columns, and it is not necessary that the number of rows be equal to the number of columns. Generally, the width of the parity register will be equal to the width of the code word, although it may be less.

Each parity bit is calculated by counting the number of ones (1's) in a given column. Parity may be calculated according to either an odd or an even scheme, although odd parity is usually preferred. For an odd parity scheme, if the number of ones (1's) in the column is odd, the parity bit for that column will be zero (0), as the column already has odd parity. If the number of ones (1's) in the column is even, the parity bit for that column will be a one (1). The parity bit provides a method of identifying errors in a column without column specific information, such as which bits are ones (1's) and which bits are zeroes (0's). The column-wise parity is calculated based only on the total number of ones (1's) in the column. This allows the parity indicator for each column to be updated at the time of each write to memory, based on the "old" bit (i.e., the respective bit of the code word previously written into that column), the "new" bit (i.e., the respective bit of the new code word which is going to be written into that column), and the current value of the corresponding parity indicator.

According to one embodiment, at the time of power-on initialization a predetermined valid code word bit pattern is written to each word location in the DRAM 30. All parity bits in the parity register 40 may then be simultaneously initialized to an appropriate value, depending upon the selected parity scheme. Thereafter, the parity information stored in the parity register 40 will be updated as each successive write into the DRAM 30 is performed. According to this approach, the DRAM 30 starts operation in a fully valid state and all collateral operations, such as scrubbing, can proceed as usual.

Alternatively, as a part of the initialization sequence, the current-contents (i.e., noise) may be read out and the parity logic circuit 38 allowed to calculate the current parity and store it into the parity register 40. Thereafter, the parity information will be updated as each of the actual code words are written into the DRAM 30. We consider this approach to be less desirable, however, since the contents of the DRAM 30 at initialization will, in general, not comprise valid word-wise code words, and special procedures will need to be provided either to generate (and rewrite) valid check bits 34 depending upon the current data bits 32 or to selectively disable validation and/or scrubbing of invalid code words.

Continuing now with FIG. 3, the parity logic circuit 38 is coupled to a WEDAC 42 which generates code words to be stored in a selected location in the DRAM 30. For a write operation, the WEDAC 42 receives new data bits and generates/concatenates the appropriate check bits to produce the new code word. Simultaneously, the DRAM 30 is accessed to retrieve the old code word stored in the selected location. Thereafter, parity logic circuit 38 compares the new code word to the old code word to determine which, if any, of the parity bits in the parity register 40 need to be changed. If a particular bit of an old code word is different from the same bit of the new code word then the corresponding parity bit will need to be toggled as a result of the write. If the old and new bits are the same, the current state of that parity bit will still be correct after the write.

Whereas the WEDAC 42 is designed for single-bit error correction and double-bit error detection, addition of the parity detection unit 36 facilitates correction of many double-bit errors detected in a retrieved code word. When the WEDAC 42 detects a single-bit error, operation of the parity logic circuit 38 is temporarily suspended while the WEDAC 42 fixes the single-bit error, so that the parity is maintained at the correct value. To eliminate any other single-bit errors, the WEDAC 42 may proceed to scrub the entire DRAM 30. When the WEDAC 42 detects a multi-bit error, a sequencer (discussed below) employs the parity logic circuit 38 to recalculate, for all stored code words, the bit-wise parity bits, and then compares each recalculated parity bit to the corresponding bit stored in the parity register 40. This bit-wise recalculation operation, which we refer to as a "panic scrub", will access the entire parity space covered by the parity register 40. The recalculated parity bits and the stored parity bits may then be exclusive-ORed to determine which bits are different. In this arrangement, each parity bit which is different, in general, indicates a error in the corresponding bit of the code word containing the multi-bit error. Using this bit-wise information, together with the word-wise information provided by the WEDAC 42, the sequencer can usually identify and correct the erroneous bits of the code word.

Occasionally, when one double-bit error is detected, additional double-bit errors are present in the DRAM 30. For example, assume that two double-bit word-wise errors occur such that one particular bit of each of two different stored code words are both in error, i.e., one of the erroneous bits comprising each of the double-bit errors, say bit z, is "stacked" in a bit-wise sense. According to the parity logic circuit 38, the parity bit corresponding to bit z will still appear to be valid. Furthermore, the parity detection unit 36 will be unable to assist in the identification and correction of the other erroneous bits, since insufficient information is available to decide which detected single-bit bit-wise error corresponds to which of the double-bit word-wise errors. Similar, unresolvable ambiguities exist when two double-bit word-wise errors occur such that each of the erroneous bits is in a different bit position of the respective code words, and when multiple stacked double-bit errors occur. It is, of course, quite feasible to physically partition the DRAM 30 into two or more distinct subarrays and provide a parity error detection unit for each. In such an arrangement, all double-bit word-wise errors can be detected and corrected so long as no more than one occurs simultaneously in the same subarray or "parity space". The odds of this happening can be improved by partitioning the DRAM 30 logically, rather than physically, in such a way as to insure that adjacent physical rows in the DRAM 30 lie in different logical parity spaces. One way to do this would be to use a selected subset of the address bits to distinguish between parity spaces, effectively interleaving or interdigitating the logical subarrays. Such interdigitating has been used in conventional WEDACs to greatly reduce the likelihood that a single noise event, e.g., an alpha particle, will corrupt multiple bits of the same code word. Since simple parity is inadequate to resolve multiple, double-bit errors within the same parity space, multiple interdigitated spaces can significantly improve data integrity in environments in which correlated multi-bit errors occur frequently.

Figure 4:
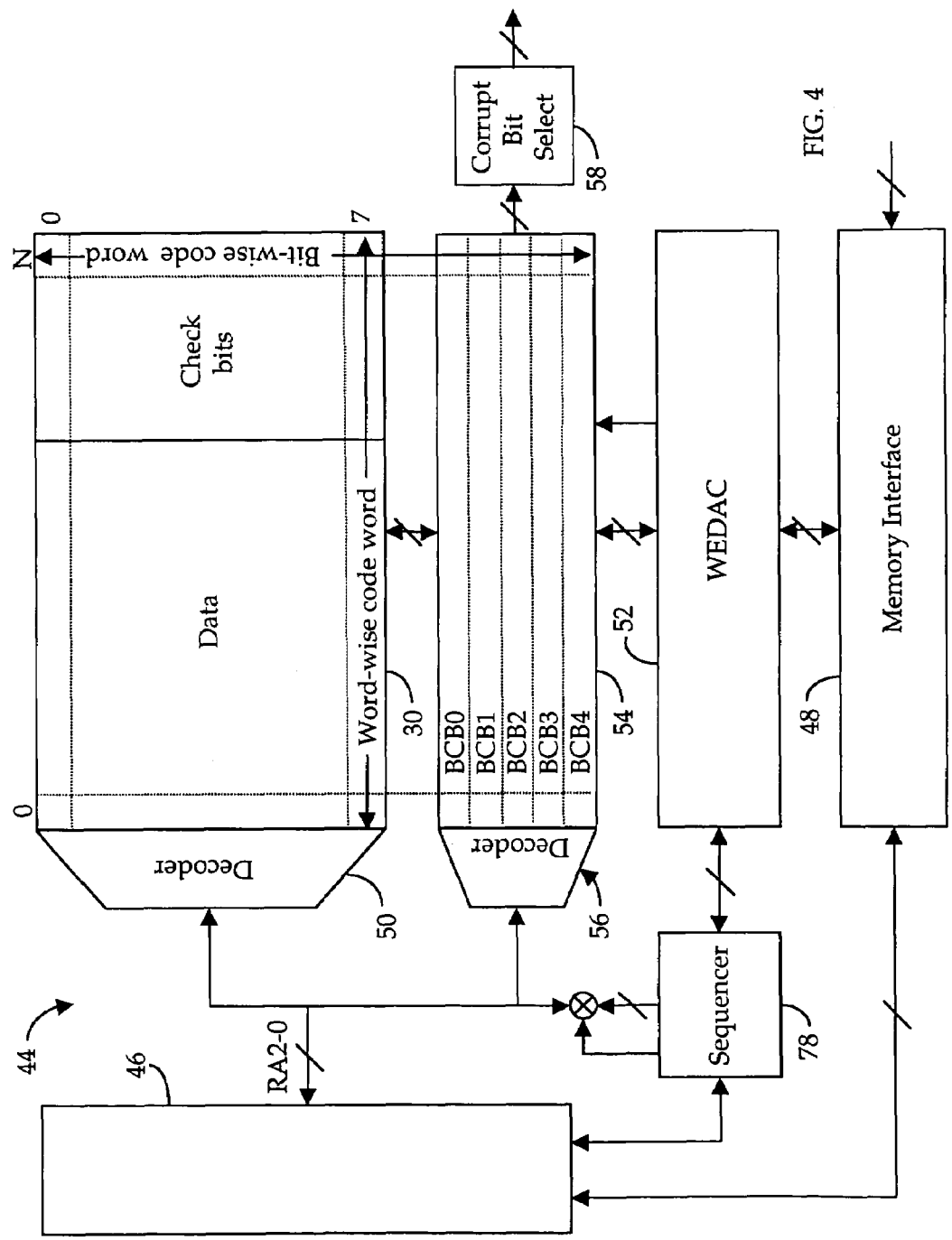
FIG. 4 illustrates in block diagram form a memory system having orthogonal EDAC units according to one embodiment of the present invention.

As illustrated in FIG. 4, our bit-wise error detection and correction methodology may be extended to combine a BEDAC with a WEDAC, such as those shown in FIGS. 1 and 2, to provide greater data integrity than bit-wise parity in environments exhibiting significant levels of non-correlated (i.e., random) errors. In the memory system 44, a memory controller 46 controls the operation of the DRAM 30, and a memory interface 48 controls requests for access to the DRAM 30 by an external source, such as a processor (not shown). Coupled to DRAM 30 is a decoder 50 which decodes the row address information to access (N+1)-word-wise code words stored at respective storage locations within DRAM 30. By way of example, the memory cells within DRAM 30 are organized in rows, numbered 0 to 7, and columns, numbered 0 to N. A code word is stored in each row, across the data bits 32 and the check bits 34. The memory system 44 also includes a WEDAC 52 which receives new data from the memory interface 48 and provides appropriate code words to the DRAM 30. Simultaneously, each code word is provided to a BEDAC 54, which sequentially generates a bit-wise code word for each column in the DRAM 30. For convenience of visualization, the bit-wise code words are shown stored in a columnar fashion, wherein each "column" in the BEDAC 54 stores the several bit-wise check bits for an associated column in the DRAM 30. As was the case for the word-wise WEDAC 52, the bit-wise check bits, together with the data bits in a respective column in the DRAM 30 can be thought of as comprising a bit-wise code word. As discussed above, the column height can be logically partitioned to provide interleaved or inter-digitated parity spaces.

According to the design of one embodiment, the bit-wise check bits (BCBs) are stored in the rows of the BEDAC 54 as illustrated in FIG. 4, wherein the first row of the BEDAC 54 stores BCB0 for each column of the DRAM 30, the second row of the BEDAC 54 stores BCB1 for each column of the DRAM 30, and so on. As in the WEDAC 52, the error correction algorithm per se implemented by the BEDAC 54 can be quite conventional. As is common in such algorithms, and unlike simple parity, each of the bits comprising each code word in the DRAM 30 affects more than one of the respective set of BCBs. For example, according to one possible scheme shown in FIG. 5A, the word-wise code word bits stored in row 0 in the DRAM 30 affect BCB0, BCB1, and BCB2 of the respective bit-wise code word stored in the BEDAC 54, the row 1 code word bits effect BCB0, BCB1 and BCB3, and so on. To implement such a scheme, the BEDAC 54 is coupled to a BEDAC decoder 56 which enables the appropriate BCBs according to the decoding table shown in FIG. 5B, wherein RA[2-0] comprise the same row address select signals provided by the memory controller 46 during an access to the DRAM 30. In accordance with our invention, the BEDAC 54 effectively implements a classic "block error detection and correction" code, not in the traditional word-parallel manner, but bit-serially, i.e., in whatever order the "data" bits happen to appear, including purely random. We refer to our method of operation as "random access error detection and correction" (RAEDAC) to distinguish it from a traditional word-wise error detection and correction algorithm applied to a serial data stream in which the order of bit presentation is predetermined and cannot vary without invalidating the algorithm. Before we show how the BEDAC 54 cooperates with the WEDAC 52 to significantly enhance the ability of the memory system 44 to detect and correct random, multiple, double-bit errors, we will describe the BEDAC 54 in greater detail.

Figure 6:
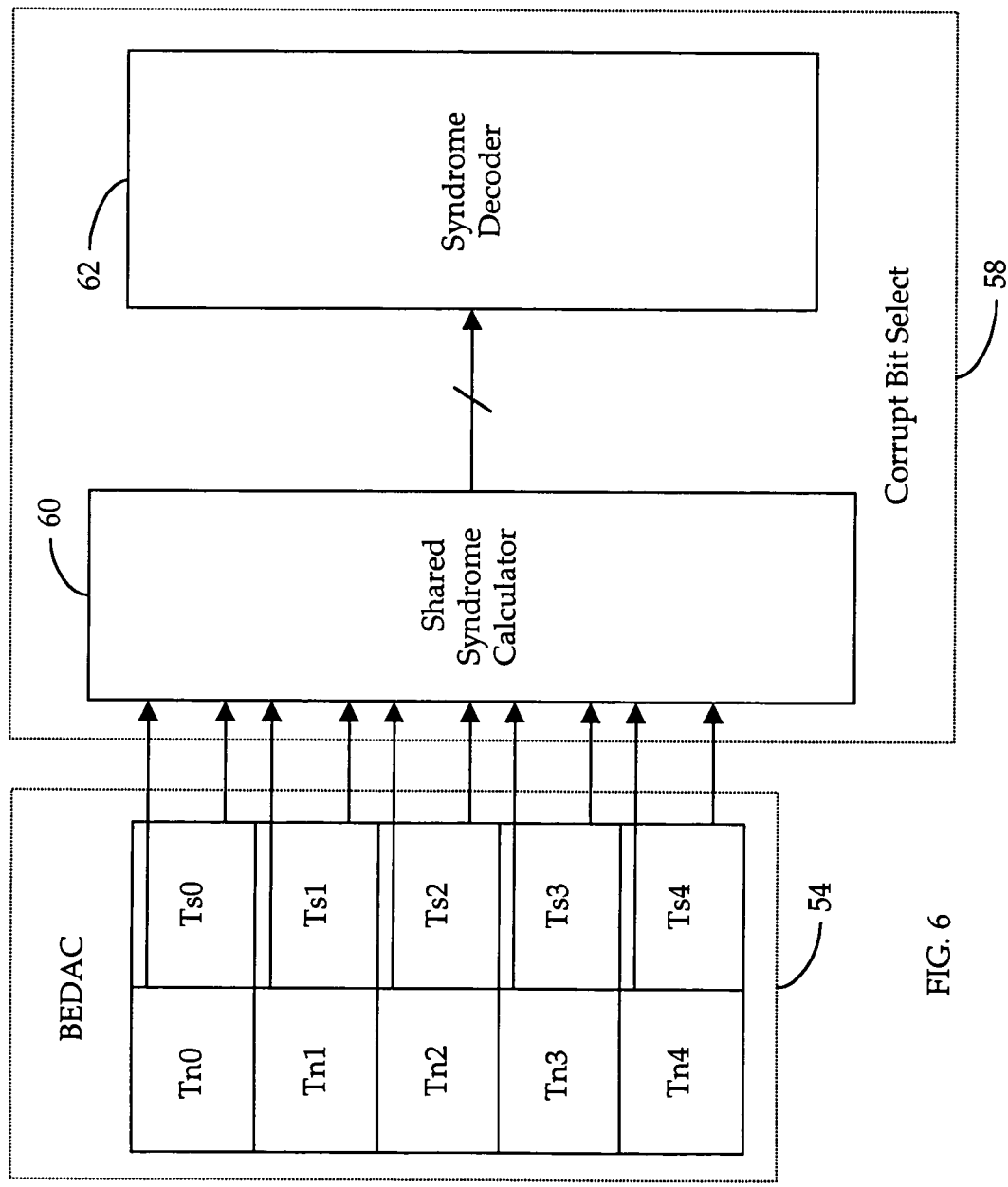
FIGS. 6 and 7 illustrate in block diagram form portions of an orthogonal EDAC unit as in FIG. 4.

As shown in FIG. 6, for each column in the DRAM 30, the BEDAC 54 has two sets of five (5) toggle flip-flops or "T-flops", for each of the BCBs: a normal set (Tn[0–4]) which is active during normal operation, and a scrub set (Ts[0–4]) which is active only during a scrubbing operation. In such an arrangement, each pair of sets of T-flops are associated with a respective one of the (N+1) bits comprising a word-wise code word. At the end of a double-bit error scrub operation, all of the T-flops in the respective set (i.e., either the normal or scrub set for a given code word bit location) are simultaneously coupled to a corrupt bit select 58, wherein a shared syndrome calculator 60 calculates a syndrome. Each syndrome is then decoded by a respective syndrome decoder 62 in a conventional manner to provide information regarding the number of bits in error (one, two, or even three, depending upon the selected algorithm), and, if only one bit is in error, the row address corresponding to the particular bit in the bit-wise code word that is in error. When considered collectively, the set of all bit-wise syndromes generated by the BEDAC 54 indicate which of the "columns" in the DRAM 30 have bits in error. Similarly, the syndromes generated by the WEDAC 52 indicate which particular "rows" in the DRAM 30 have bits in error. By combining the word-wise and the bit-wise error information, it is possible in many cases to unambiguously identify those row/column intersections at which the bit errors are present. Thus, as in the simple parity embodiment, all single double-bit word-wise errors can be detected and corrected. In addition, however, the BEDAC 54 can detect and correct all bit-wise single-bit errors, leaving any remaining stacked double-bit errors (now, hopefully, only single-bit word-wise errors) to be cleaned up in a follow-up scrub operation. Furthermore, using the BEDAC 54, single occurrences of double stacked double-bit word-wise errors can be detected and corrected since such a unique error pattern can occur if and only if the bits located at all four of the row/column intersections are in error.

Figure 7:
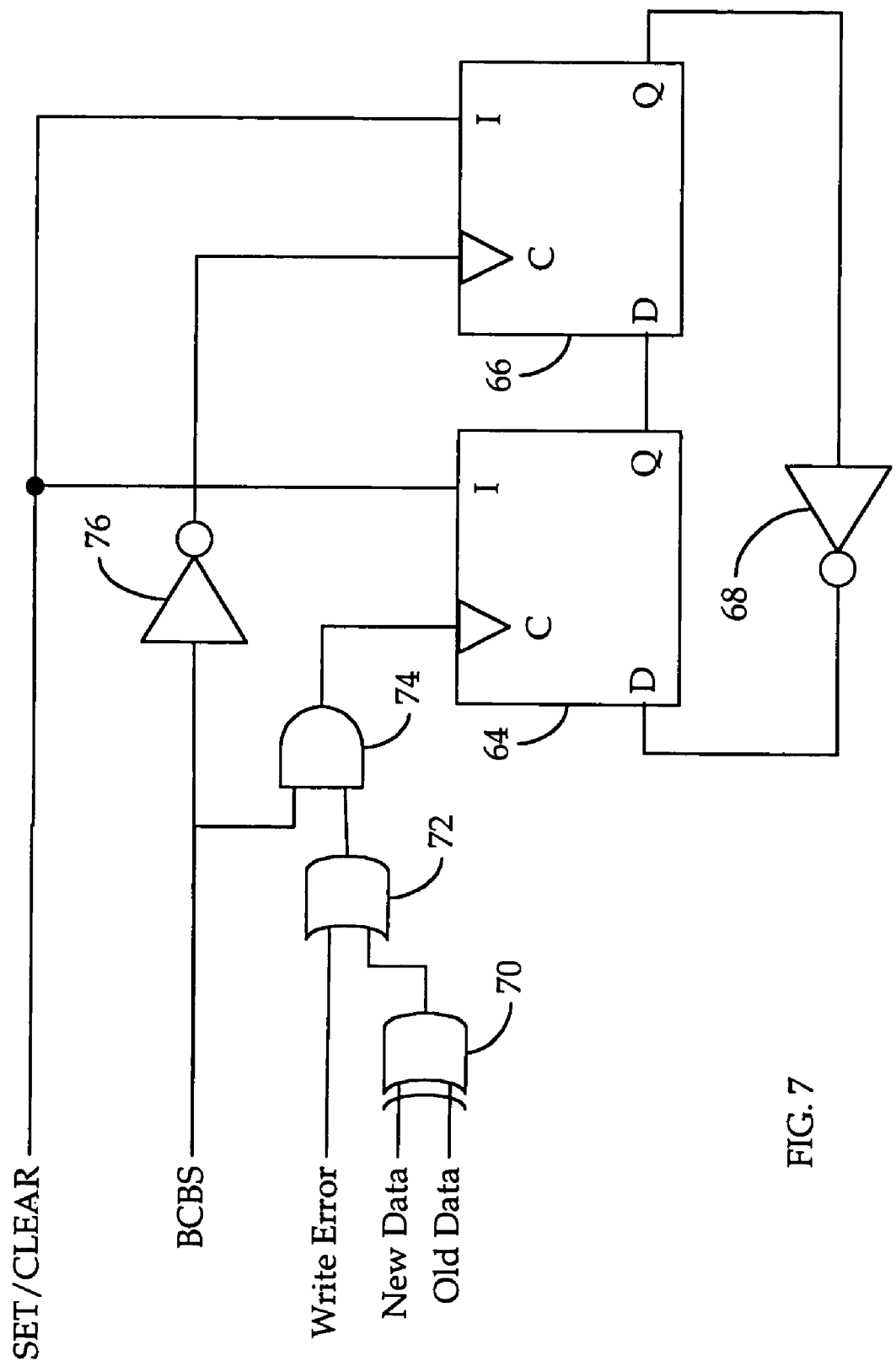

By way of example, a typical T-flop, Tx, illustrated in FIG. 7, comprises a first D latch 64 and a second D latch 66, arranged in a classic toggle configuration with the Q output of the first D latch 64 coupled to the D input of the second D latch 66, and the D input of the first D latch 64 coupled to the Q output of the second D latch 66 via an inverter 68. An exclusive-Or gate (XOR gate 70) receives the new data bit to be stored in a memory cell of the DRAM 30, and the old data bit retrieved from that memory cell. So long as the old and new data bits match, the output of XOR gate 70 is a zero (0); when they differ, the output is a one (1). The output of XOR gate 70 is input into an OR gate 72, together with a write error signal. If either the old and new data values are different or the write error signal is asserted, the output of OR gate 72 is a one (1), and otherwise is a zero (0). As will be described below, the write error signal is used to correct the contents of the T-flop when an error has been detected in the old code word.

On the occurrence of a write error or different old and new data bits, a one (1) output from the OR gate 72 and input to AND gate 74 together with a respective one of the BCB signals, BCB[i] (described above in conjunction with FIG. 5). When the BCB[i] signal is asserted and the output of OR gate 72 is a one (1), AND gate 74 applies to the clock (C) input of the first D latch 64 a one (1), this occurs when there is either a write error or a difference has been detected between the old and new data bits. The AND gate 74 applies a zero (0) to the clock (C) input otherwise. Simultaneously, the BCB[i] signal, inverted by an inverter 76, is applied to the clock (C) input of the second D latch 66. In this arrangement, the T-flop is selectively toggled in response to each assertion of the BCB[i] signal, depending upon the output of OR gate 72.

To facilitate system initialization, each D-flip-flop has an asynchronous initialization input, I, which is coupled to a Set/Clear (SET/CLEAR) signal, the logic state of which depends upon the location of the respective T-flop in the BEDAC 54, as shown, for the given example, in the leftmost column in FIG. 5A. In this example, an odd parity scheme is being used so if an odd number of rows effect the BCB signal the corresponding T-flop is cleared, and if an even number of rows effect the BCB signal, the corresponding T-flop is set. In this way, the BCB0 for each column is set, the BCB1 for each column is cleared, etc. Since the initialization scheme will be determined at design time, the SET/CLEAR signal for each T-flop can be assigned the appropriate logic value in hardware.

Referring now once again to FIG. 4, the memory system 44 also includes a sequencer 78 the state logic of which is selected to deal with the several forms of errors which the WEDAC 52 and BEDAC 54 are capable of detecting and/or correcting. One possible method for operating the sequencer 78 is illustrated in flow diagram form in FIG. 8, which comprises FIGS. 8A through 8D. At 80, the DRAM 30 is initialized and the T-flops of the BEDAC 54 are set or cleared according to the selected, word-wise code bit assignments. At 82, the sequencer 78 loops, waiting for a memory access. At 84, if the access is a refresh operation with no scrub operation, there is nothing for the sequencer 78 to do, so processing simply loops back to 82 after refreshing the DRAM 30. At 86, if the access is a refresh with scrub, then, at 88, single-bit errors are scrubbed using just the WEDAC 52. At 90, if no multi-bit errors are discovered, then processing returns to 82 to await a next access. However, if there is a row with a multi-bit error, processing continues at B, detailed in FIG. 8C.

If, at 92, the access is a read, then the DRAM 30 is read, at 94. At 96, if no error is detected by the WEDAC 52, the read access is complete and processing returns to 82 to wait for the next access. If, at 98, no multi-bit error is detected, then, at 100, the single-bit error is fixed, completing the read access, and processing returns to 82 to await the next access; otherwise, processing continues at B, detailed in FIG. 8C. If, at 92, the access is not a read, and therefore must be a write, processing continues at A, which is detailed in FIG. 8B.

Figure 8A:
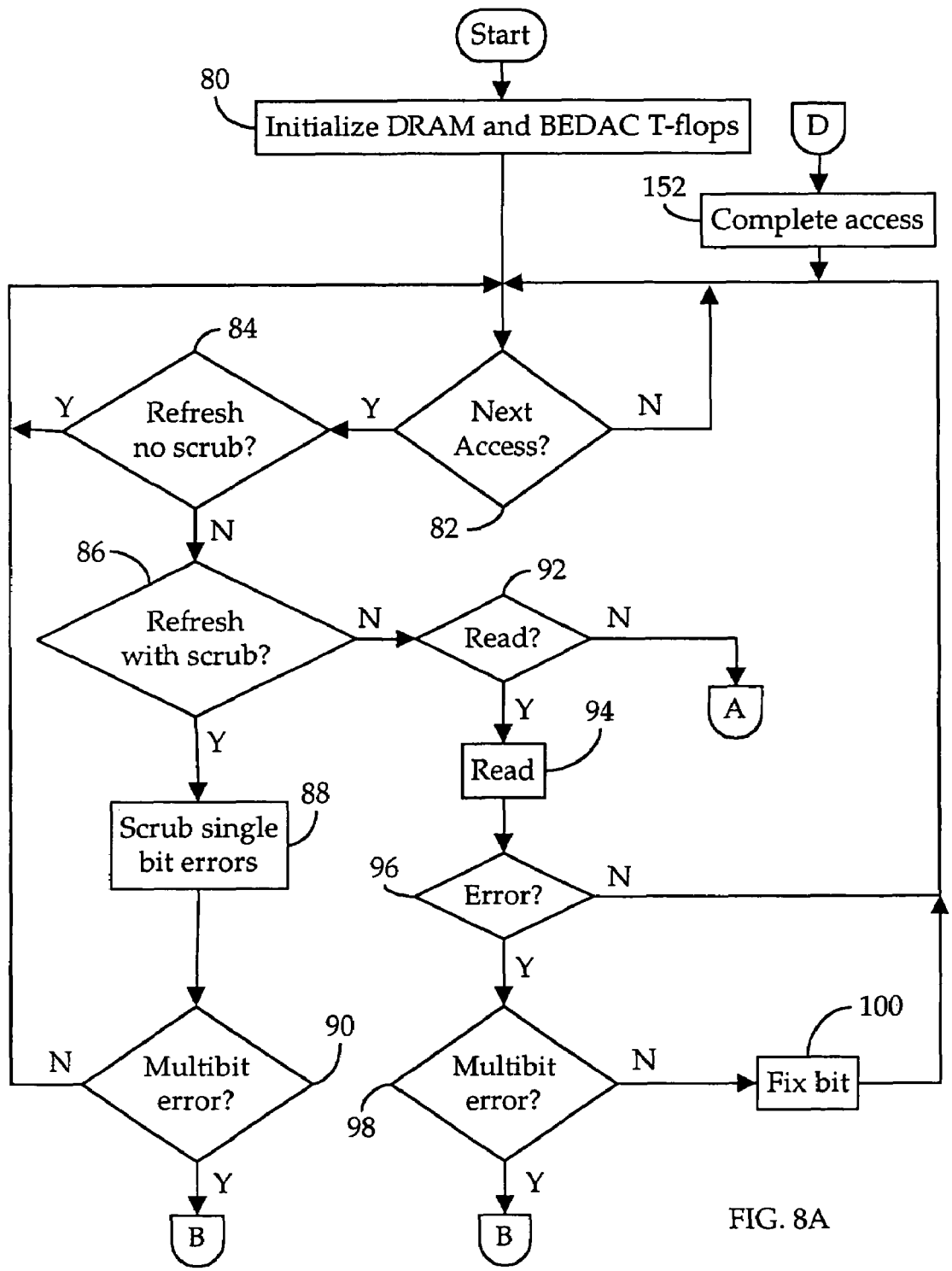
FIGS. 8A to 8D, illustrates in flow diagram form error detection and correction as in FIG. 4.
Figure 8B:
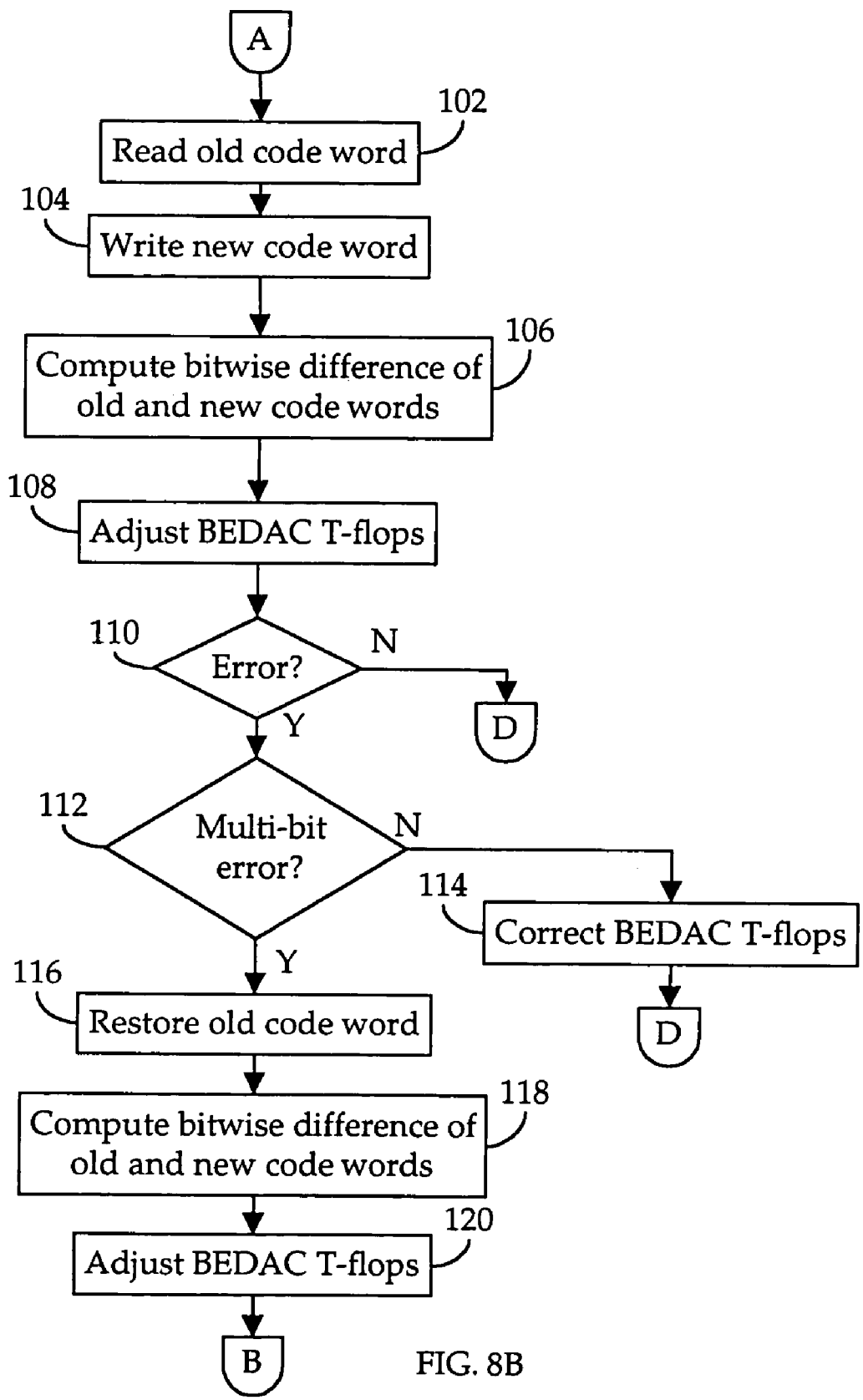

Continuing with the write access, from A in FIG. 8B, the old code word is read from the DRAM 30, at 102. At 104, the new code word, which has already been generated by the WEDAC 52, is written into the DRAM 30 in order to minimize access cycle time in the usual case of no error. At 106, the bit-wise difference between the new and old code words is calculated to detect errors in the accessed code word. At step 108, the T-flops of the BEDAC 54 are adjusted based on the values of each bit in the accessed code word according to the scheme of FIG. 5A, where each row effects multiple BCBs. Simultaneously, the old code word is forwarded to the WEDAC 52 for error checking. If, at 110, the WEDAC 52 detects no error in the old code word, then processing returns to D to await the next access. On the other hand, if, at 112, a single-bit error is detected in the old code word, the BEDAC 54 corrects the appropriate T-flops at 114, and processing returns to D. If, at 112, a multi-bit error is detected in the old code word, then, at 116, the old code word is written back into the DRAM 30. At 118, the bit-wise difference of the old and new code words is then calculated, so that, at 120, the T-flops of the BEDAC 54 can be readjusted accordingly, thus restoring the system to the state that existed just prior to the current write access. Of course, an extra set of "shadow" latches (not shown) might be provided to selectively capture the information in the old and new sets of T-flops, thereby facilitating later state restoration. Processing then continues at B, detailed in FIG. 8C.

Figure 8C:
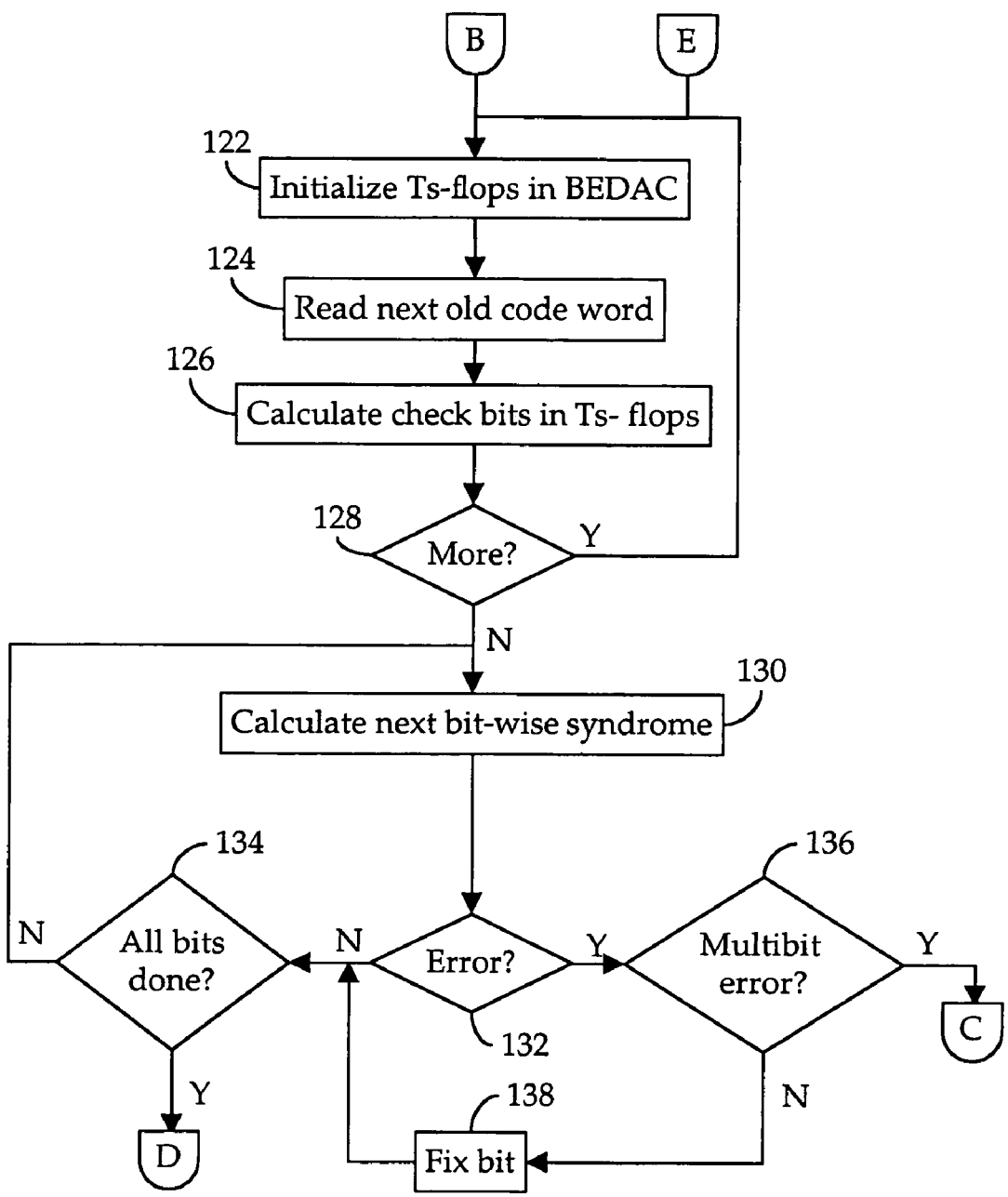
Figure 8D:
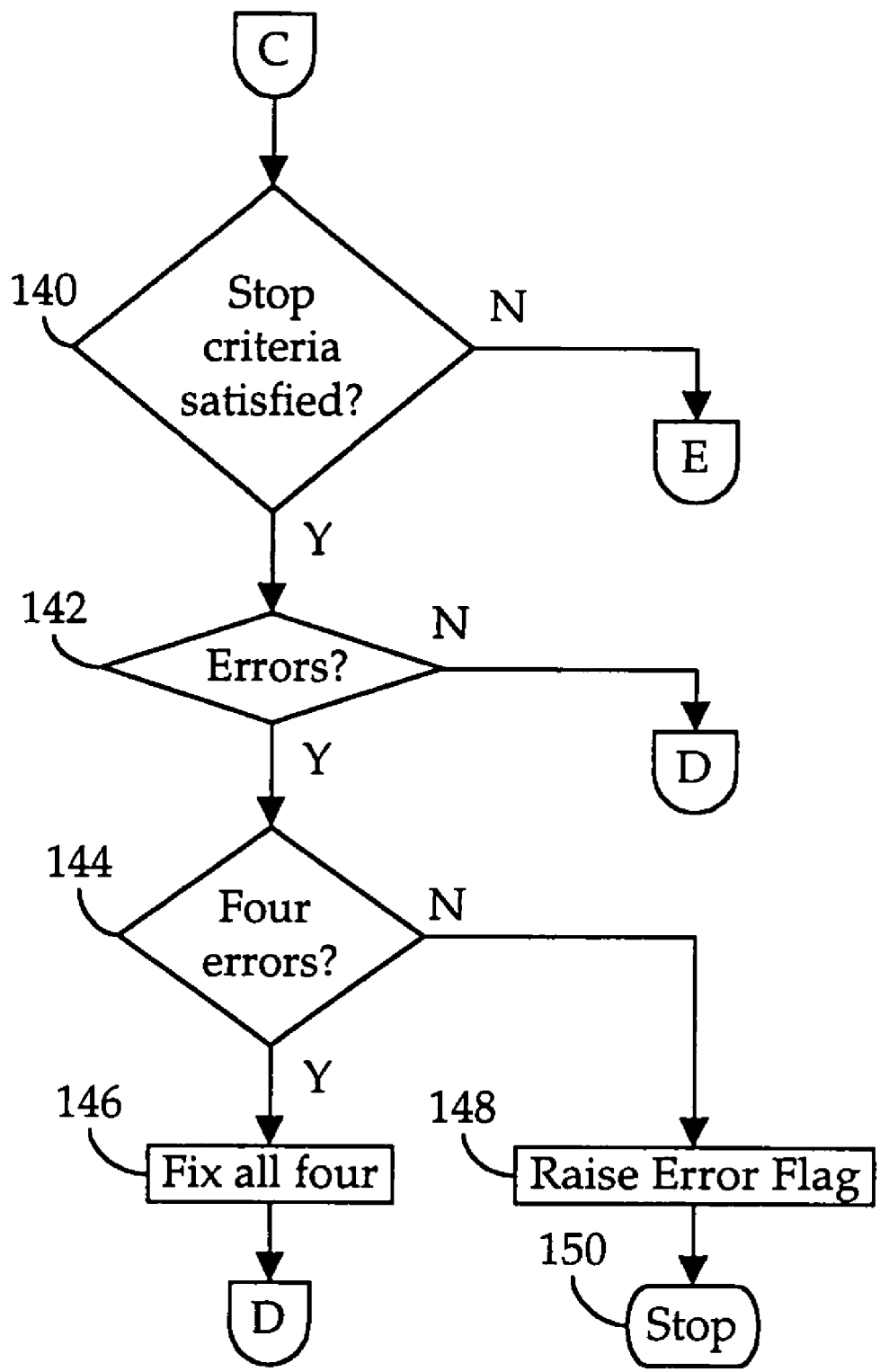

Illustrated in FIGS. 8C and 8D is a special "panic" scrub subroutine that is invoked only in the event that a double-bit error is detected in the course of performing a normal read/write/refresh/scrub operation. During this operation, all of the code words in the DRAM 30 which are included in the parity space covered by the BEDAC 54 are accessed and checked for errors. At 122, the T-flops in the BEDAC 54 are set or cleared according to the predetermined bit-wise code bit assignments, such as in the example shown in FIG. 5A. After initialization, at 124, a first one of old code words, say code word 0, is read from DRAM 30 and, at 126, the BEDAC 54 recalculates the bit-wise check bits using the Ts-flops. At 128, if more old code words remain to be read, processing loops back to 124. After all of the old code words have been read and the bit-wise check bits recalculated, the corrupt bit select 58 generates a bit-wise syndrome, at 130, using the shared syndrome calculator 60. So long as the syndrome decoder 62 detects no errors, at 132, and there are bits remaining to be checked, at 134, processing loops back to 130 to continue sequencing through all bit locations until no bits remain to be checked, at which point processing returns to D to await a next access. If, at 132, an error is detected, but it is determined, at 136, that it is only a single-bit bit-wise error, then, at 138, the error is fixed and processing rejoins the loop at 134. If, at 136, a multi-bit error is detected, processing continues at C, detailed in FIG. 8D.

Continuing from C in FIG. 8D, at 140, the sequencer 78 determines if a predetermined stop criteria is satisfied. According to one embodiment, the predetermined stop criteria is a fixed number of times through the multi-bit correction process starting at 122. For example, the sequencer 78 may initialize a loop counter (not shown), at 122, and increment/decrement it, at 122, until the counter reaches a predetermined maximum/minimum value, at 140. Alternatively, the sequencer 78 may initially clear a loop control flag (not shown), at 80, set it each time a bit error is successfully corrected, as at 88 and 138, and then check it (and clear it also), at 140, to determine if at least one error was fixed the last iteration through the process loop. Failure to fix at least one bit error per loop iteration would constitute the stop criteria. In any event, if the stop criteria is not satisfied at 140, processing returns to E. If, at 142, there are no more errors, processing returns to D to finish the current access, if necessary, and await the next access. If errors still remain, then, at 144, the sequencer 78 determines if there are exactly four (4) bits still in error. The four-error case is a special circumstance which can occur only when there are exactly two stacked double-bit errors. If four errors are indeed detected, then, at 146, the sequencer 78 can fix all four by reading out the two words that the WEDAC 52 indicates have double-bit word-wise errors and inverting just those bits that the BEDAC 54 indicates have double-bit bit-wise errors. Processing then returns to D to await the next access. If, at 144, this special four-error case is not detected, the memory system 44 has experienced a catastrophic breach of data integrity which cannot be repaired, since the information provided by the orthogonal WEDAC/BEDAC combination is insufficient to identify the remaining bits in error. Accordingly, at 148, upon detecting an uncorrectable error, a special, uncorrectable error flag (not shown) is raised to indicate that the information stored in the DRAM 30 is unreliable and should not be used, after which the sequencer 78 stops, at 150.

Returning now to FIG. 8A, at D, upon repairing any errors detected in the course of a read or a write access, the sequencer 78 completes the access, 152, and rejoins the main flow, at 82, to await the next access. Although we have illustrated what we believe to be a reasonable flow for the sequencer 78, many variations can be envisioned. The primary goal of all such flows is to efficiently detect and correct as many errors as possible, in view of the inherent limitation of the instantiated error detection and correction hardware as discussed herein, and to selectively report all uncorrectable errors. In achieving this goal, attention should be paid to minimizing the duration of time during which the DRAM 30 will be unavailable for normal operation. As experience is gained with a DRAM 30 manufactured in a particular technology, packaged in a selected medium and operated in a specific environment, the steps or states in the flow for the sequencer 78 can be rearranged or modified in accordance with our invention in order to optimize, for example, the overall reliability and data integrity of the DRAM 30, the area cost, or the time to perform a column-wise scrub.

Depending upon the severity of a multi-bit error, the sequencer 78 may not be required to scrub the entire parity space. For example, assume that a double-bit error is detected by the WEDAC 52 in the code word retrieved from row 2 of the DRAM 30. From the code table of FIG. 5A, it can be seen that each bit of a code word stored in row 2 affects only three of the five column check bits: BCB0, BCB1 and BCB4. In order to fully verify the parity of, for example, just BCB4, then it is sufficient to examine the bits stored in only three of the other seven rows: row 4, row 5, and row 7. If, in the course of retrieving and checking the code words in these rows, no other word-wise multi-bit error is detected (remember that all single-bit errors can be immediately corrected by the WEDAC 52), then sufficient information is already available in the BEDAC 54 to unambiguously identify the two bits in error in the code word retrieved from row 0. Similarly, it can be shown that all single occurrences of double-bit errors can be resolved by scrubbing around one-half of the parity space. On the other hand, since it is not assured that a second multi-bit error will not be detected in the minimal scrub space, the sequencer 78 should perform the panic scrub as if a second multi-bit error will indeed be detected, and then, if the assumption proves incorrect, terminate the scrub early, as soon as the minimal scrub space has been examined. The information necessary to determine for each code word which other code words comprise the minimal scrub space is embodied, for example, in each of the respective BCB[i] columns in FIG. 5B, and can easily be extracted using convention hardware techniques. In general, it can be shown that, for larger parity spaces and well-balanced encoding algorithms, the minimal scrub space approaches one-third of the parity space.

Even though we have disclosed several preferred embodiments of our invention, we recognize that many other embodiments are not only possible but, perhaps, more desirable in specific circumstances. However, such alternate embodiments will, in general, employ variations or combinations of the disclosed embodiments. For example, as we noted above, it may be desirable in some applications to partition, logically or physically, the DRAM 30 by either rows/words and columns/bits, or both, and provide separate and distinct WEDAC/BEDAC units for each distinct coverage space. As we also explained above, increased error coverage can be obtained by interdigitating the coverage spaces, either by rows/words and columns/bits, or both. Of course, depending upon the reliability, cost and performance requirements of the memory system in particular application, combinations of no error coverage, parity only, or full EDAC, by rows/words and columns/bits, or both, may be appropriate.

Figure 9:
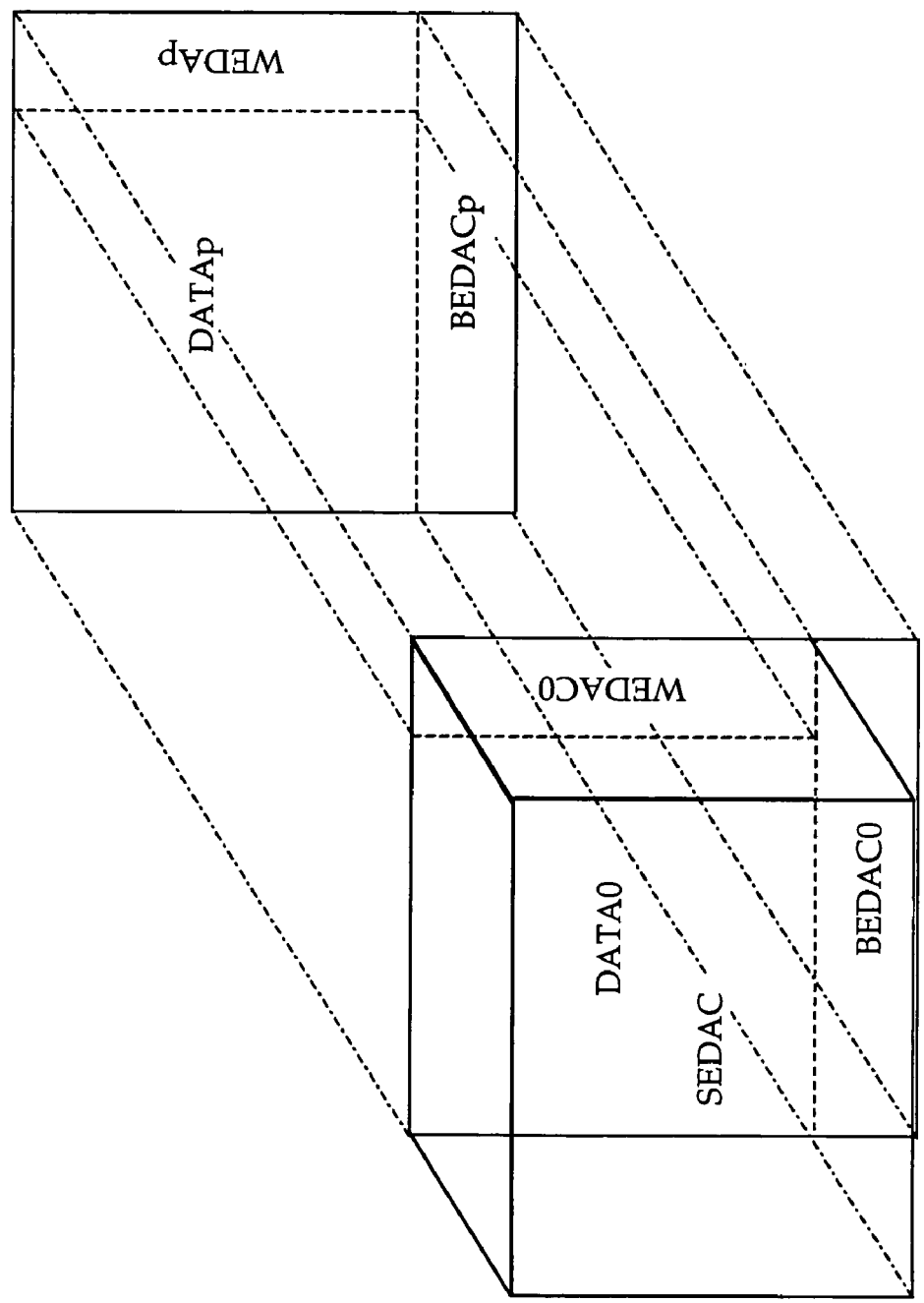
FIG. 9 illustrates in block diagram form a three-dimensional memory array comprising a stack of planes of rows and columns, each plane having respective row and column EDACs, and a stack EDAC.

Although we believe that our two-dimensional WEDAC/BEDAC embodiments are sufficiently robust to handle reasonably anticipated FIT rates for the memory densities available using present and near term semiconductor manufacturing/packaging technologies, we also anticipate that future technology improvements and the ever increasing demand for more system memory will raise FIT rates to the point where a two-dimensional instantiation may be inadequate. At such time, our RAEDAC invention can be easily reapplied to create a three-dimensional solution. For example, as shown in FIG. 9, a very large memory array may be partitioned into a "stack" of, say (p+1), memory planes, each of which consists of the familiar planar array of rows and columns. In such an instantiation, each plane would have a respective WEDAC[0–p] for dealing with word-wise errors in the data array, and a BEDAC[p+1] for assisting an associated sequencer (not shown) in dealing with bit-wise errors, either in the data array or the dynamic check bit portion of the WEDAC, as discussed above. In addition, however, a stack-wise EDAC or "SEDAC" (and associated sequencer, similar to that discussed in regard to FIG. 8) is provided to assist in dealing with stack-wise errors in the data and WEDAC check bit arrays. Note that the SEDAC coverage could be extended to include the BEDAC check bit arrays in appropriate circumstances. It can be shown that many of the multi-bit error scenarios which are intractable for a two-dimensional instantiation become readily resolvable with the additional information available from the SEDAC. Of course, it will be readily apparent that higher-dimensional embodiments are certainly possible. In general, the degree to which the memory is partitioned into distinct parity spaces depends upon a number of interrelated issues, including price, performance, power, data integrity criticality, and the like. Similar considerations are relevant to the question of which form the RAEDAC's should take: simple parity, multi-parity, interdigitated multi-parity, or full EDAC.

Thus it is apparent that there has been provided, in accordance with the present invention, a method for providing distributed EDAC operation which reduces the complexity of the individual EDAC units and increases the speed of calculation. The present invention, in particular, provides a random access EDAC which is capable of assisting in the detection and correction of errors not accessible by a traditional one-dimensional EDAC unit. The combination of a WEDAC and a BEDAC allows more errors to be detected and corrected and reduces the instances of catastrophic data loss. Additional protection can be obtained using higher-dimensional RAEDACs, such as a SEDAC. Those skilled in the art will recognize that modifications and variations can be made without departing from the spirit of our invention. Therefore, it is intended that our invention encompass all such variations and modifications as fall within the scope of the appended claims.

We claim:

1. A memory system comprising:
    a memory comprising first and second groups of dynamic memory cells, each cell storing a bit;
    an access circuit connected to the memory to access, during an access cycle, a selected one of:
        a first set of the bits stored in said first group of said memory cells; and
        a second set of the bits stored in said second group of said memory cells;
    an error detection circuit connected to the access circuit and said memory to detect an error in a bit accessed during said access cycle, comprising:
        a first error detection circuit to detect an error in a bit of said first set of accessed bits; and
        a second error detection circuit to detect an error in a bit of said second set of accessed bits; and
    a scrub circuit connected to the memory to scrub, during a scrub cycle, a selected one of:
        said first set of the bits stored in said first group of said memory cells; and
        said second set of the bits stored in said second group of said memory cells.

2. The memory system of claim 1 wherein said first and second error detection circuits also correct said bit errors, respectively.

3. The memory system of claim 1 wherein said first and second subsets of said accessed bits are comprised of equal numbers of said bits.

4. The memory system of claim 1 wherein said first and second subsets of said accessed bits are comprised of different numbers of said bits.

5. The memory system of claim 1 wherein said access cycle and said scrub cycle are non-overlapping.

6. The memory system of claim 1 wherein said access cycle overlaps said scrub cycle, and wherein, during said access cycle, said access circuit accesses said selected one of said first and second sets of bits, and, during said scrub cycle, said scrub circuit scrubs the other of said selected first and second sets of bits.

7. The memory system of claim 1 wherein the memory system comprises an integrated circuit.

8. A memory system comprising:
 a memory comprising a plurality of dynamic memory cells arranged in a plurality of planes of rows and columns, each cell storing a bit and corresponding memory cells of each plane forming respective stacks;
 an access circuit connected to the memory to access, during said access sequence, all of the bits stored in all of said planes of said memory cells; and
 an orthogonal error detection circuit connected to the access circuit and said memory to detect an error in a bit accessed during said access sequence, comprising:
  a row error detection circuit to detect an error in a bit of a row of said accessed bits;
  a column error detection circuit to detect an error in a bit of a column of said accessed bits; and
  a stack error detection circuit to detect an error in a bit of a stack of said accessed bits.

9. The memory system of claim 8 wherein said first, second and third error detection circuits also correct said bit errors, respectively.

10. The memory system of claim 8 wherein the stack error detection circuit comprises a parity check circuit.

11. The memory system of claim 8 wherein the stack error detection circuit comprises a RAEDAC unit.

12. The memory system of claim 8 wherein the column error detection circuit comprises a parity check circuit.

13. The memory system of claim 8 wherein the column error detection circuit comprises a RAEDAC unit.

14. The memory system of claim 8 wherein the row error detection circuit comprises a parity check circuit.

15. The memory system of claim 8 wherein the row error detection circuit comprises an EDAC unit.

16. The memory system of claim 8 wherein the memory system comprises an integrated circuit.

* * * * *